United States Patent
Hodges et al.

(10) Patent No.: US 8,584,250 B2
(45) Date of Patent: Nov. 12, 2013

(54) METHODS AND APPARATUS FOR INFORMATION ASSURANCE IN A MULTIPLE LEVEL SECURITY (MLS) COMBAT SYSTEM

(75) Inventors: Rother V. Hodges, Wakefield, RI (US); Patrick A. Luvara, East Greenwich, RI (US)

(73) Assignee: Rite-Solutions, Inc., Pawcatuck, CT (US)

( * ) Notice: Subject to any disclaimer, the term of this patent is extended or adjusted under 35 U.S.C. 154(b) by 864 days.

(21) Appl. No.: 12/565,413

(22) Filed: Sep. 23, 2009

(65) Prior Publication Data

US 2013/0276133 A1    Oct. 17, 2013

Related U.S. Application Data

(60) Provisional application No. 61/099,236, filed on Sep. 23, 2008.

(51) Int. Cl.
*G06F 7/04*    (2006.01)

(52) U.S. Cl.
USPC .......... 726/26; 726/22; 726/23; 726/24; 726/25; 713/187; 713/188

(58) Field of Classification Search
USPC .......... 709/224; 714/48; 726/22, 26
See application file for complete search history.

(56) References Cited

U.S. PATENT DOCUMENTS

| | | | |
|---|---|---|---|
| 6,523,141 B1 * | 2/2003 | Cantrill | 714/48 |
| 2010/0125664 A1 * | 5/2010 | Hadar et al. | 709/224 |

* cited by examiner

*Primary Examiner* — Longbit Chai
(74) *Attorney, Agent, or Firm* — Ryan, Mason & Lewis, LLP

(57) ABSTRACT

Methods and apparatus are provided for information assurance in a multiple level security (MLS) combat system. A plurality of tasks are executed, where at least one of the tasks requiring a transition from a first security level to a second security level. At least one of the tasks are executed on a cloud computing system; and a kernel is employed to prevent a leakage of data between at least two of the tasks. The cloud computing system comprises a virtualization layer and provides one or more operating systems, as well as interface access control to data. The kernel provides a mechanism for the transition from the first security level to the second security level. The kernel optionally tags one or more data records with a security classification to allow one or more classification levels to be segregated for role-based data access.

18 Claims, 6 Drawing Sheets

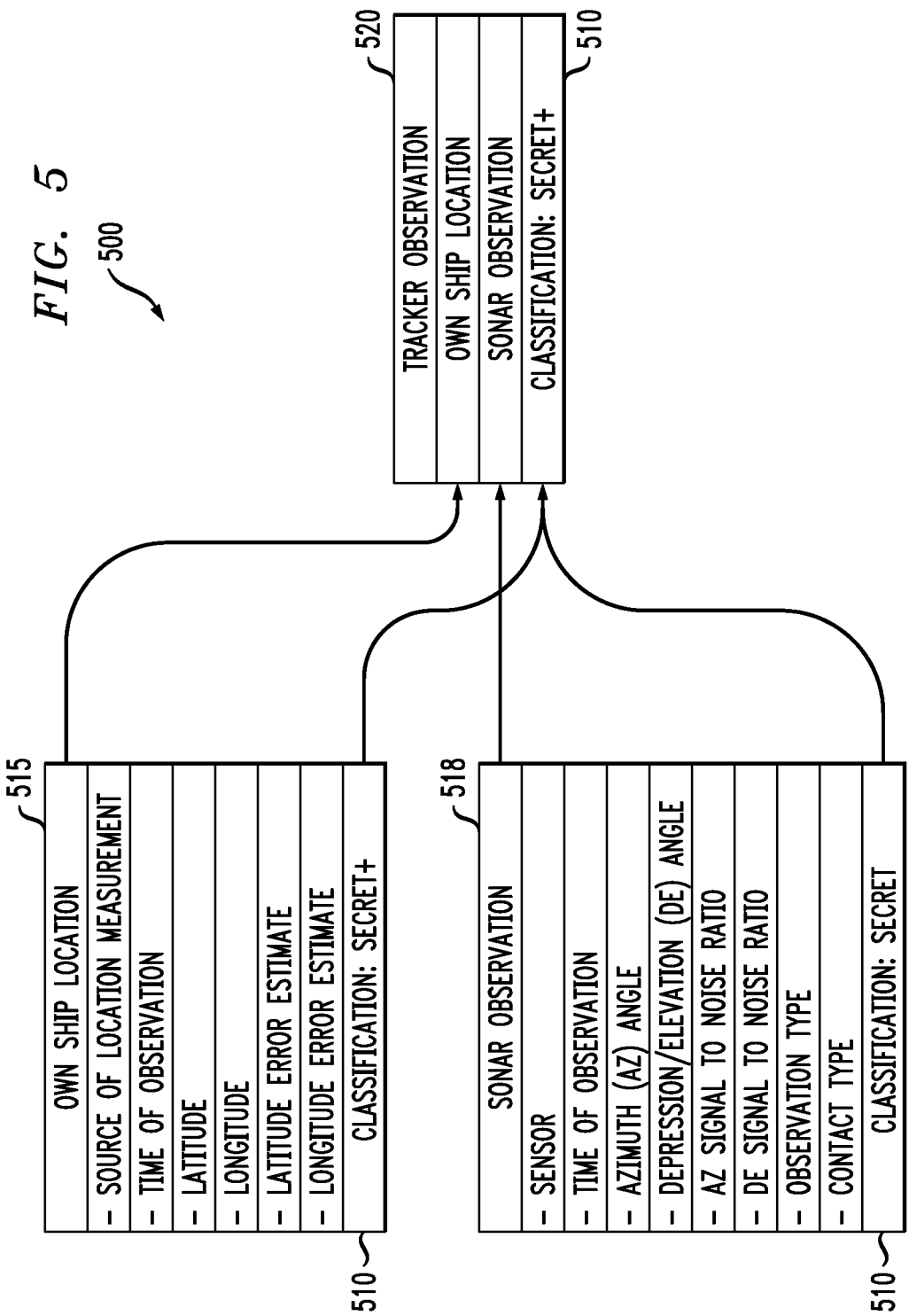

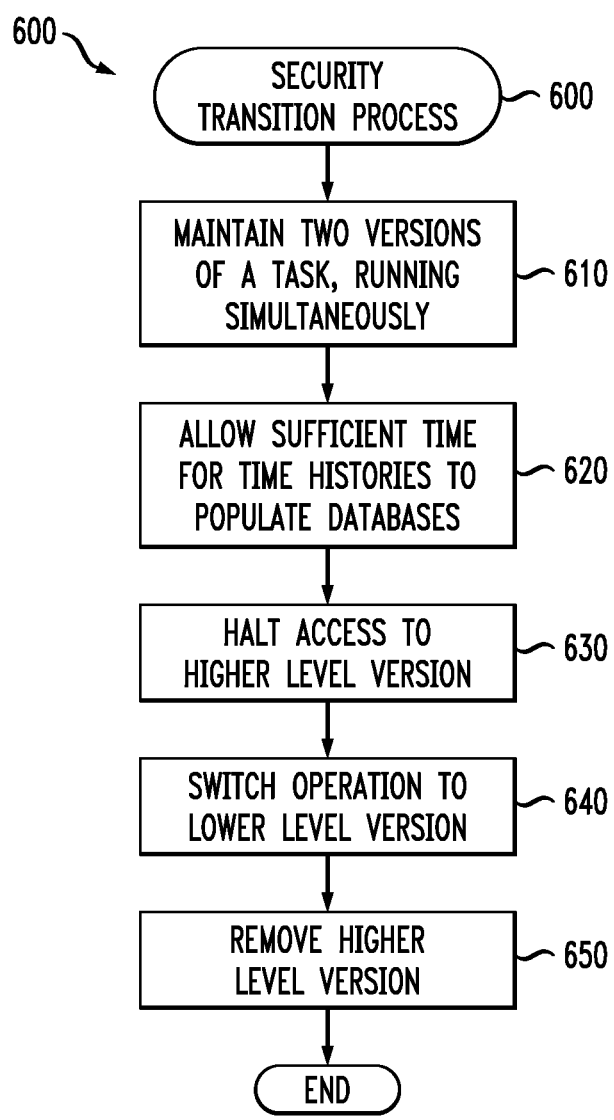

METHODS AND APPARATUS FOR INFORMATION ASSURANCE IN A MULTIPLE LEVEL SECURITY (MLS) COMBAT SYSTEM

CROSS-REFERENCE TO RELATED APPLICATIONS

This application claims priority to U.S. Provisional Application Ser. No. 61/099,236, filed Sep. 23, 2008, incorporated by reference herein.

BACKGROUND OF THE INVENTION

Military systems must often supply decision makers with timely information while smoothly operating with data at multiple levels of security classification, in accordance with applicable Information Assurance (IA) policies and requirements. Current submarine combat systems, for example, operate at a "system high" level, with significant portions of the non-propulsion electronics system operating at the current highest classification level. Operating at "system high" is a brute force approach that achieves security goals but diminishes agility. In addition to the "system high" part of the combat system, there are other, mostly separate, networks operating at fixed lower and higher levels with limited and highly controlled connections.

To change the combat system's classification level requires a complex system-by-system, processor by processor, network switch-by-switch process that can now only be accomplished using a large team and taking longer than a watch. Due to time and risk to subsystem stability, security level transitions can only be accomplished dockside. The current system design limits interoperability with the fleet when operating at "system high" and requires that operators perform a posture transition at sea to return the system to full interoperability.

Increasingly, cloud computing techniques are being applied to many processing tasks. Cloud computing customers typically reduce costs by renting cloud usage from a third-party provider. Customers consume cloud resources as a service and pay only for resources that they use. The multi-tenancy offered by cloud computing enables the sharing of resources and costs across a large pool of users. Generally, cloud computing provides virtualized resources as a service over the Internet. Cloud computing services often provide applications online that are accessed by a user from a web browser, while the software and data are stored on remote servers.

A need exists for improved techniques for military system operation in a tactical environment that requires multiple security levels. A further need exists for a multiple level security (MLS) architecture for tactical environments. Yet another need exists for military systems that are capable of operating at multiple security levels that provides the real time, high performance and high availability and reliability levels of a tactical system. A further need exists for military systems that offer improved flexibility and development time.

SUMMARY OF THE INVENTION

Generally, methods and apparatus are provided for information assurance in a multiple level security (MLS) combat system. According to one aspect of the invention, a plurality of tasks are executed, where at least one of the tasks requiring a transition from a first security level to a second security level. At least one of the tasks are executed on a cloud computing system; and a kernel is employed to prevent a leakage of data between at least two of the tasks.

According to further variations of the invention, the cloud computing system comprises a virtualization layer and provides one or more operating systems, as well as interface access control to data. The kernel provides a mechanism for the transition from the first security level to the second security level.

According to further aspects of the invention, the kernel optionally tags one or more data records with a security classification. The security classification tag employs one or more features to prevent tampering. In addition, the security classification tag can be employed to control access to the corresponding data record. Finally, the security classification tag allows one or more classification levels to be segregated for role-based data access.

A more complete understanding of the present invention, as well as further features and advantages of the present invention, will be obtained by reference to the following detailed description and drawings.

BRIEF DESCRIPTION OF THE DRAWINGS

FIG. 5 illustrates a number of data records incorporating the data tagging techniques of the present invention; and FIG. 6 is a flow chart describing an exemplary security transition process 600 incorporating features of the present invention.

DETAILED DESCRIPTION

Figure 1:
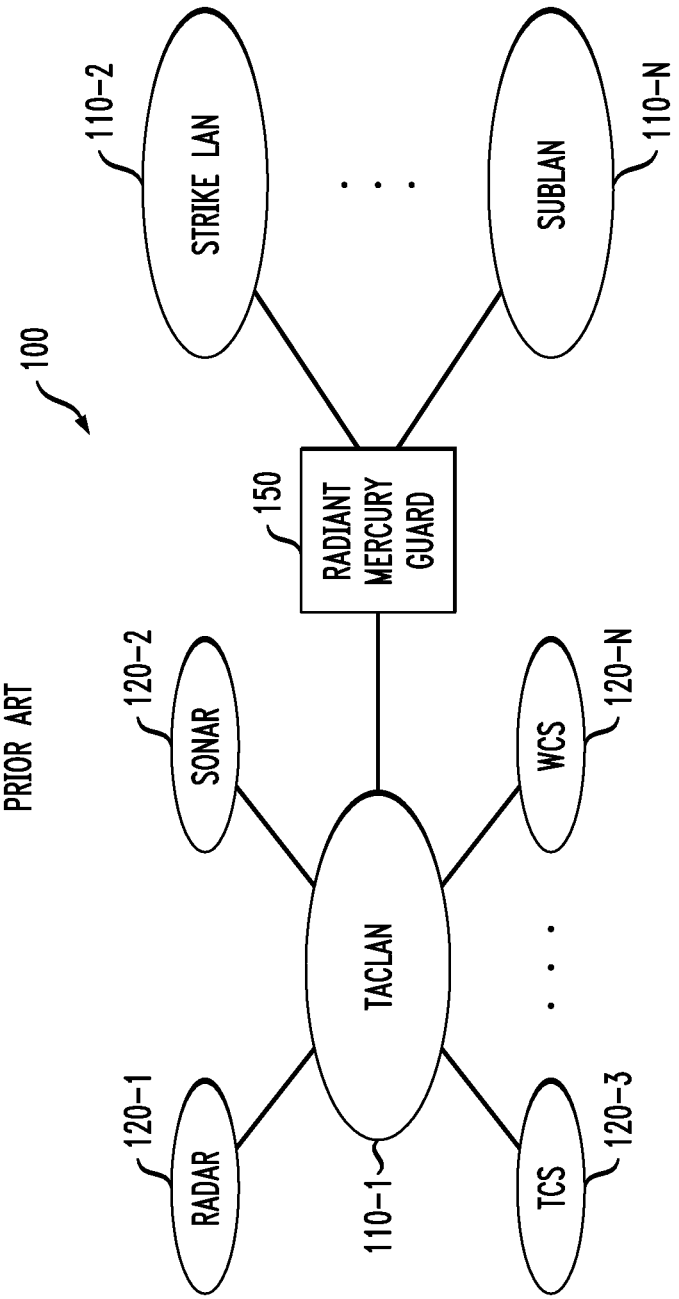
FIG. 1 illustrates a conventional architecture for an exemplary submarine tactical system.

The present invention provides an improved military system operation in a tactical environment that requires multiple security levels. A multiple level security (MLS) architecture is disclosed for tactical environments. The disclosed MLS architecture can operate at multiple security levels and provide the real time, high performance and high availability and reliability levels required of a tactical system. While the present invention is illustrated in the context of a military application, such as a naval system, the present invention may be employed in any system that transitions between a plurality of security classifications, as would be apparent to a person of ordinary skill in the art.

According to one aspect of the invention, cloud computing concepts are applied to high assurance operating systems. In this manner, the present invention leverages the efficient use of shared resources that is provided by cloud computing, as well as the improved security-focused resources that are available on cloud computing systems. For example, cloud computing systems are known to offer a number of secure operating systems. In addition, the cloud computing systems provide data access and control, and, as discussed further below in conjunction with FIG. 6, provide a mechanism for uniform transitioning from one security level to another.

A developer can use any of a number of environments for development and can select a familiar operating system. A virtualization layer hides hardware and security details from the end user. A further benefit of the cloud computing concepts of the present invention is the flexible allocation of processors (e.g., virtual machines) to tasks.

According to another aspect of the invention, discussed further below in conjunction with FIG. 5, data tagging techniques are employed to securely mark data with the corresponding security classification. In this manner, the present invention manages access to databases, including data of varying levels of classification or sensitivity. In addition, data of various classification levels can be segregated and a role-based access approach can be employed that obviates the need for "system high" operation or for posture transformation.

The data tagging of the present invention ensures that an operator only sees the level classification data permitted by his or her login. Further, to change the classification level displayed on a given workstation, an operator would only need to log out and then log in using a new role at the new classification level. Since each log-in is independent, it would be possible to have the same display upon two workstations at different security levels providing seamless transition. To change the posture of an area, all workstations would only need to be logged in at the new level.

As discussed further below, MLS technologies including High Assurance Platform (HAP) and Multiple Independent Levels of Security (MILS) provide highly secure virtualization technology that is enhanced with the Cloud Computing concepts of Software as a Service (SaaS), Platform as a Service (PaaS), and Infrastructure as a Service (IaaS). The MILS program provides a separation kernel as the basis for the underlying trusted kernel of an operating system. The separation kernel is a very small kernel that is intended to be mathematically proven to be correct and meeting its Protection Profile requirements.

FIG. 1 illustrates a conventional architecture for an exemplary submarine tactical system 100. As shown in FIG. 1, the exemplary submarine tactical system 100 comprises a number of network enclaves 110-1 through 110-N, including a Tactical Local Area Network (TACLAN) 110-1, a strike LAN 110-2 and a SUBLAN 110-N. The exemplary network enclaves 110-1 through 110-N are connected by a radiant mercury guard 150 that manages internal data transfer between classified enclaves 110.

The data flows between enclaves that the guard 150 will allow are controlled by formally approved rules. When the tactical system is in a "secret" state, the guard 150 allows free data flow between non-tactical enclaves and the tactical system. The guard 150 provides separation between a number of the enclaves 110, and can allow low to high data transfer from the tactical system. When the tactical system level is raised, the guard 150 restricts communication between the Secure Internet Protocol Network (SIPRNET) enclave and the tactical enclave, allowing low to high data transfers and restricting tactical to SIPRNET enclave communications at the secret level. There are different rule sets required when the tactical enclave for each of the different tactical system period processing states, which are outside the scope of the present invention. Separate rule sets may be allowed to increase communications after the condition that brought the tactical system high has passed but the system has not been downgraded.

The exemplary TACLAN 110-1 comprises a radar system 120-1, sonar system 120-2, Tactical Control System (TCS) 120-3 and a Weapon(s) Control System (WCS) 120-N. A typical submarine tactical system 100 would include additional enclaves 110 and systems 120, which have been omitted for ease of illustration.

Given this existing Non-Propulsion Electronic Systems (NPES) architecture, downgrading the tactical system from a system high to a secret state requires removing all data written to file storage and rebooting system processors and network devices.

One aspect of the present invention recognizes that one or more of the systems 120 or corresponding tasks within such systems 120 can be implemented using cloud computing techniques.

Figure 2:
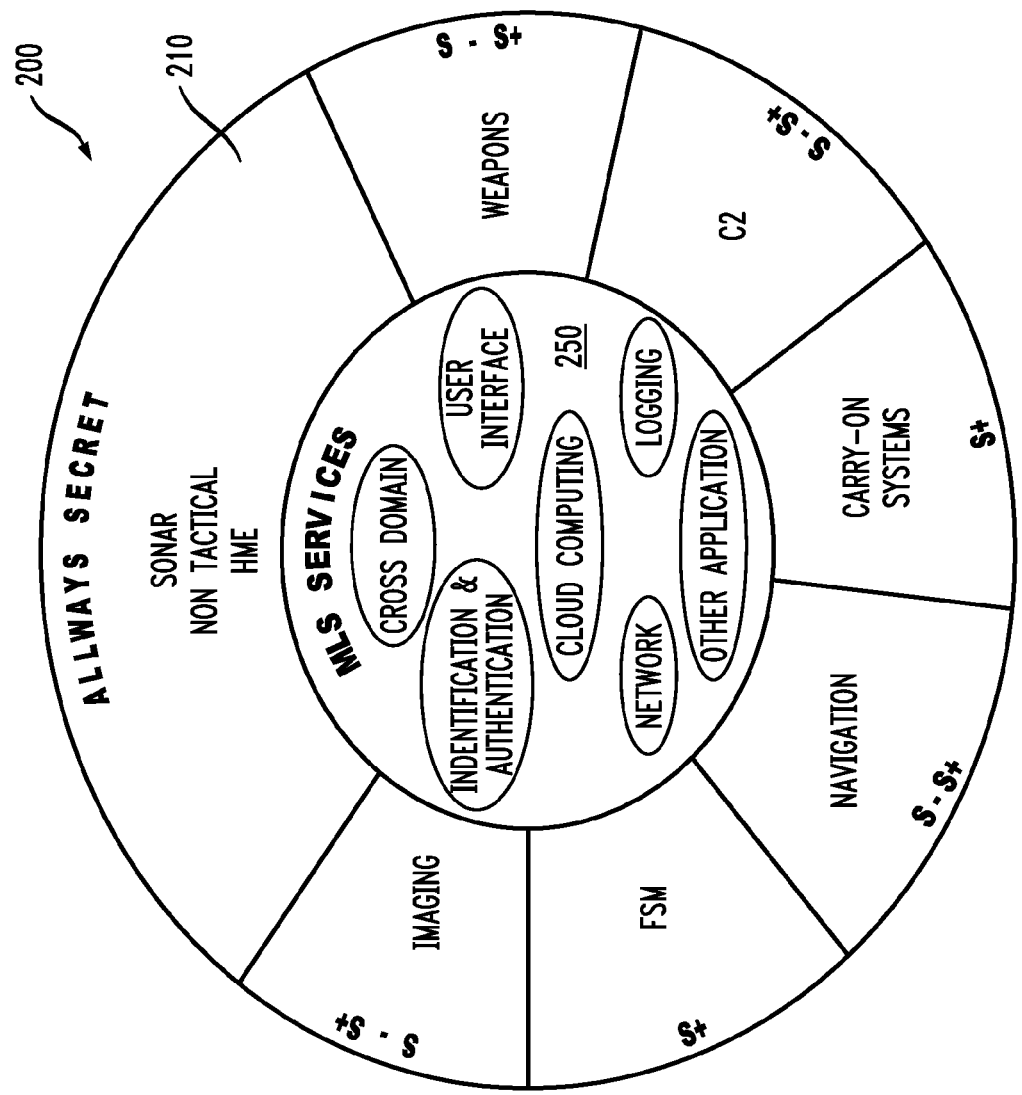
FIG. 2 illustrates an exemplary security architecture incorporating aspects of the present invention.

FIG. 2 illustrates an exemplary security architecture incorporating aspects of the present invention. The security architecture 200 is for an exemplary Submarine Warfare Federated Tactical System (SWFTS) of the Navy. The exemplary security architecture 200 illustrates a mix of system high concepts on the outer ring 210 and MLS concepts on a central cloud core 250 to yield an architecture that facilitates incorporation of information assurance technology. The objective of this architectural approach is to produce a system that removes IA details from the user's scope of concern and minimizes or eliminates the need for a posture transition. This architecture 200 will improve the ship's ability to interoperate with a strike group or the theater forces while still storing and processing higher than secret information. It is noted that the label "S-S+" indicates "secret to above secret" data.

With the disclosed architecture 200, as much as possible of the systems 120 are at a secret always level and do not need to be downgraded to a normal, lower, manning security posture. The S+ and MLS processing will only need to be downgraded when the system is decommissioned or when manning requires.

Figure 3:
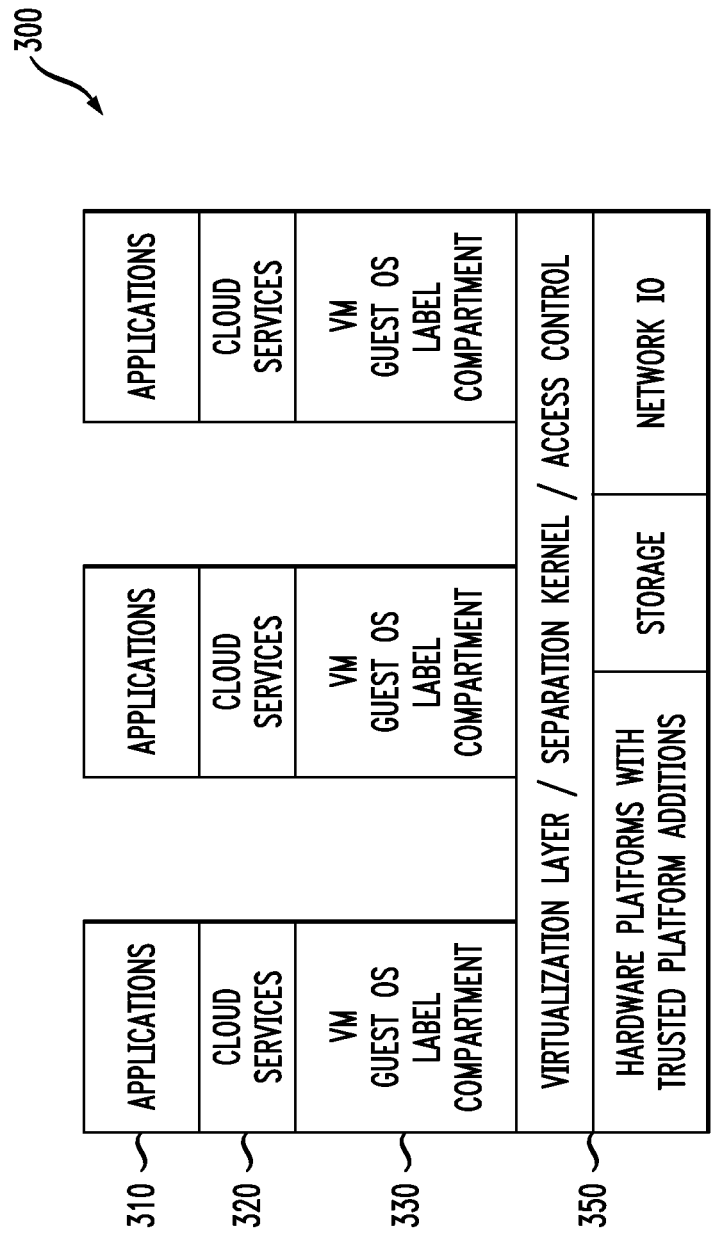
FIG. 3 illustrates an exemplary layered processing approach of the cloud computing aspects of the present invention.

FIG. 3 illustrates the layered processing approach 300 of the cloud computing aspects of the present invention. As shown in FIG. 3, a first layer 310 comprises one or more applications that are executed over a cloud services layer 320. An operating system/virtual machine layer 330 overlays a cross domain guard layer 350. The use of virtual machines segments processing within a single server. In addition, the use of the virtual machine allows multiple guest operating systems to run each in its own virtual machine on the same server and at different classification levels.

The cross domain guard layer 350 is discussed further below in conjunction with FIG. 4. As shown in FIG. 3, the cross domain guard layer 350 comprises a virtualization layer, separation kernel and access control functionality. In addition, the cross domain guard layer 350 comprises hardware platforms with trusted platform additions, storage and network interfacing.

Figure 4:
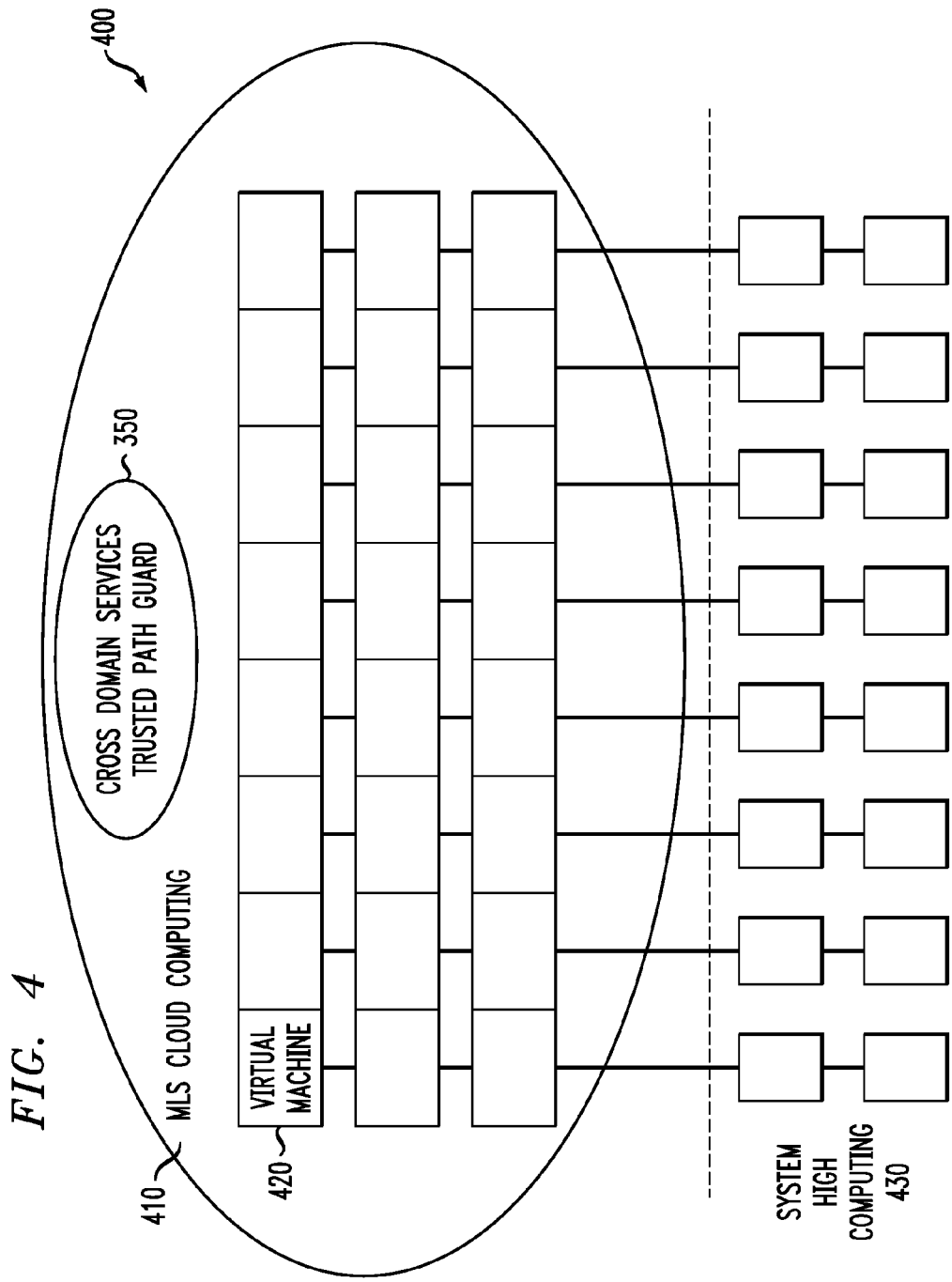
FIG. 4 illustrates the basic architecture of the overall cloud environment.

FIG. 4 illustrates the basic architecture 400 of the overall cloud environment 410. As shown in FIG. 4, the cross domain guard layer 350 controls the transfer of information between the cloud 410 and the system high computing tasks that are executing "off cloud" 430. The cloud 410 comprises a number of virtual machines 420 for implementing one or more tasks 120.

As previously indicated, data tagging techniques are employed to securely mark data with the corresponding security classification. In this manner, the present invention manages access to databases, including data of varying levels of classification or sensitivity. In addition, data of various classification levels can be segregated and a role-based access approach can be employed that obviates the need for "system high" operation or for posture transformation.

FIG. 5 illustrates a number of data records incorporating the data tagging techniques of the present invention. As shown in FIG. 5, a number of conventional data records 500 are extended to include a security classification field 510. In one exemplary embodiment, when two data structures 515, 518 are combined, the new combined structure 520 takes the highest classification of the component structures 515, 518.

The security classification field 510 can optionally have associated assurance information, such as a cryptographic checksum, to prevent tampering.

Security Level Transitions

An operational unit, such as a ship, may be operating in a higher than secret posture, because one or more data elements 510, such as own ship location, are classified higher than the normal ship state, secret. While very little of the widely distributed data is actually higher than secret, data records become elevated by association (there do exist large higher than secret data collections but they are not widely shared). Generally, the level of the ship's posture is determined manually, and it does not change rapidly. As previously indicated, communication between enclaves 110 is controlled by one or more guards 150 with strict rule sets. After a ship completes a phase of the mission at higher than secret posture, it would like to downgrade tactical systems. While there are typically no highly classified data elements being distributed thought the system, data histories in subsystems can be highly classified and must be managed.

Currently, the data has not been marked securely with classification. The data is held by the subsystem, and there is no assured way to selectively purge the data. There are currently three alternatives for purging data: remove and replace disks; securely wipe data storage on disks and cryptographically check that program storage has not changed; and store data with strong cryptographic key (then, to downgrade, destroy key and cryptographically check that program storage has not changed).

In addition, there are legal requirements for long term retention of automatically logged data that must be addressed. Thus, before data can be purged, the required logged data must be saved on removable media. Thus, to transition the whole enclave, the following steps must currently be performed:

Get swap disks out of storage;
Archive and verify required log files;
Remove swap disks, wipe disks, or destroy keys as determined by system;
Cryptographic check sum of program disks;
Any disks that do not check require wipe and rebuild or replace;
Power down work stations and network;
Change guard rule sets; and
Restore network and reboot systems.

The required time is on the order of 6 to 14.5 hours. In addition, all data history is lost across transition and the transition cannot be done while the ship is underway The present invention provides an improved transition process with high assurance separation. As previously indicated, data is marked securely; data archiving/logging is separate from system and marked assuredly; and data access can be controlled with assurance. Logging files can be retained, with no need for copying and removing.

FIG. 6 is a flow chart describing an exemplary security transition process 600 incorporating features of the present invention. As shown in FIG. 6, the exemplary security transition process 600 maintains two versions of a task running simultaneously, in preparation for posture transition, during step 610 (one a heightened security level, getting all data, and a second version at the desired lower level, getting only lower data).

The security transition process 600 allows sufficient time to elapse during step 620 for sufficient time histories to populate system databases. Thereafter, the security transition process 600 halts access during step 630 to the higher classification level marked data, for example, using high assurance separation mechanism.

The security transition process 600 switches operation during step 640 to the lower level version and removes the heightened security level version during step 650.

In this manner, the switching can be done by a system or task level. In addition, the possibility of cross contamination is eliminated or reduced by the underlying secure levels provided by the cloud computing system 410. Further, transitions could be centralized and nearly instantaneous, and can be implemented with a roll call for manual checking and verification.

Among other benefits, the need for guard and posture rule sets eliminated or limited. In addition, communication to on-ship or off-ship systems at other security levels could be done with version of system at equal level. The total transition time of the security transition process 600 is reduced to on the order of minutes. The transition would be controlled by requirements for data history. Higher security level data is not "lost". Rather, access is controlled, but data is not eliminated and there is no need for making copies.

In one example, the posture transition would consist of these steps:

The security officer would confirm that the required watch standers are authorized access to the new security posture if this is a more restricted posture. This need not be done at sea; this could be prepared ahead of time before deployment.

The Command and Control Center (CACC) would be informed of the need to transition the security posture in the CACC. The Commanding Officer (CO) would have the ultimate responsibility for this decision.

If the transition is from low to high, the watch standers would sequentially log out and back in at the new level. This would increase the posture of the CACC.

A properly accredited individual would change the marking of the controlling data's classification. For example, it might be own ship position which is widely shared data and propagates the classification widely though the tactical system.

If the transition is from high to low, the next step would be to allow sufficient time to allow sufficient data history marked with the lower level allow to propagate though the tactical system, for example, sufficient contact history to allow localization. This step would require coordination so that data would not disappear unexpectedly, but the coordination would be limited to operators, all located in the CACC on a given ship.

If the transition is from high to low, once sufficient lower classification data propagates though the tactical system, the subsystem displays could then be changed to display only the reduced classification level. This would mark the decrease in posture level in the CACC.

Process, System and Article of Manufacture Details

While one or more flow charts herein describe an exemplary sequence of steps, it is also an embodiment of the present invention that the sequence may be varied. Various permutations of the algorithm are contemplated as alternate embodiments of the invention. While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for executing a plurality of tasks, said method comprising the steps of:

executing at least one of said tasks on a cloud computing system; and employing a kernel to prevent a leakage of data between at least two of said tasks, wherein a task security level of at least one of said tasks switches from a first security level to a second security level on the cloud computing system, wherein at least one of said executing and employing steps are performed by at least one hardware device.

2. The method of claim 1, wherein said cloud computing system provides one or more operating systems.

3. The method of claim 1, wherein said cloud computing system provides interface access control to data.

4. The method of claim 1, wherein said kernel provides a mechanism for said transition from said first security level to said second security level.

5. The method of claim 1, wherein said cloud computing system comprises a virtualization layer.

6. The method of claim 1, wherein said kernel tags one or more data records with a security classification.

7. The method of claim 6, wherein said security classification tag employs one or more features to prevent tampering.

8. The method of claim 6, wherein said security classification tag is employed to control access to said corresponding data record.

9. The method of claim 6, wherein said security classification tag allows one or more classification levels to be segregated for role-based data access.

10. A system for executing a plurality of tasks, said system comprising:

a memory; and at least one hardware device, coupled to the memory, operative to:

execute at least one of said tasks on a cloud computing system; and employ a kernel to prevent a leakage of data between at least two of said tasks, wherein a task security level of at least one of said tasks switches from a first security level to a second security level on the cloud computing system.

11. The system of claim 10, wherein said cloud computing system provides one or more operating systems.

12. The system of claim 10, wherein said cloud computing system provides interface access control to data.

13. The system of claim 10, wherein said kernel provides a mechanism for said transition from said first security level to said second security level.

14. The system of claim 10, wherein said cloud computing system comprises a virtualization layer.

15. The system of claim 10, wherein said kernel tags one or more data records with a security classification.

16. The system of claim 15, wherein said security classification tag employs one or more features to prevent tampering.

17. The system of claim 15, wherein said security classification tag is employed to control access to said corresponding data record.

18. The system of claim 15, wherein said security classification tag allows one or more classification levels to be segregated for role-based data access.

* * * * *